(12) United States Patent
Yim (10) Patent No.: US 12,223,266 B2
(45) Date of Patent: *Feb. 11, 2025

(54) FULFILLMENT OF ACTIONABLE REQUESTS AHEAD OF A USER SELECTING A PARTICULAR AUTOCOMPLETE SUGGESTION FOR COMPLETING A CURRENT USER INPUT

(71) Applicant: GOOGLE LLC, Mountain View, CA (US)

(72) Inventor: Keun Soo Yim, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/377,648

(22) Filed: Oct. 6, 2023

(65) Prior Publication Data

US 2024/0037330 A1    Feb. 1, 2024

Related U.S. Application Data

(63) Continuation of application No. 18/096,964, filed on Jan. 13, 2023, now Pat. No. 11,960,837, which is a
(Continued)

(51) Int. Cl.
*G06F 16/00* (2019.01)
*G06F 9/451* (2018.01)
(Continued)

(52) U.S. Cl.
CPC .......... *G06F 40/274* (2020.01); *G06F 9/453* (2018.02); *G06F 40/30* (2020.01)

(58) Field of Classification Search
None
See application file for complete search history.

(56) References Cited

U.S. PATENT DOCUMENTS 11,556,707 B2 *   1/2023  Yim .............. G06F 40/274
11,960,837 B2 *   4/2024  Yim .............. G06F 40/30
(Continued)

FOREIGN PATENT DOCUMENTS

JP    2013501975    1/2013
JP    5496947       5/2014
(Continued)

OTHER PUBLICATIONS

European Patent Office; International Search Report and Written Opinion of Ser. No. PCT/US2021/032530; 16 pages; dated Sep. 2, 2021.
(Continued)

*Primary Examiner* — Shreyans A Patel
(74) *Attorney, Agent, or Firm* — Gray Ice Higdon (57) ABSTRACT

Implementations set forth herein relate to providing selectable autofill suggestions, which correspond to application actions that are at least partially fulfilled using server command data—prior to a user selecting a particular selectable autofill suggestion. Proactively fulfilling command data in this way mitigates latency between user selection of a suggestion and fulfillment of a particular action. Initially, a partial input can be processed to generate autofill suggestions, which can be communicated to a server device for further processing. The autofill suggestions can also be rendered for selection at a touch display interface, thereby allowing a user to select one of the autofill suggestions. As command fulfillment data is provided by the server, the command fulfillment data can be available to a corresponding application(s) in order that any corresponding actions can be at least partially fulfilled prior to user selection.

20 Claims, 7 Drawing Sheets

Related U.S. Application Data continuation of application No. 16/905,338, filed on Jun. 18, 2020, now Pat. No. 11,556,707.

(51) Int. Cl.
*G06F 40/274* (2020.01)
*G06F 40/30* (2020.01)

(56) References Cited

U.S. PATENT DOCUMENTS

| | | | |
|---|---|---|---|
| 2009/0043741 | A1 | 2/2009 | Kim |
| 2009/0299727 | A1 | 12/2009 | Fux |
| 2010/0235730 | A1 | 9/2010 | Campbell |
| 2011/0022635 | A1 | 1/2011 | Michael |
| 2011/0191364 | A1 | 8/2011 | LeBeau et al. |
| 2015/0278922 | A1* | 10/2015 | Isaacson ............ G06F 3/04842 705/26.8 |
| 2016/0063118 | A1* | 3/2016 | Campbell ........... G06F 16/3322 707/722 |
| 2016/0179816 | A1* | 6/2016 | Glover .............. G06F 16/24578 707/767 |
| 2016/0217124 | A1* | 7/2016 | Sarikaya ............... G06F 40/274 |
| 2017/0139937 | A1 | 5/2017 | Balasubramanian |
| 2017/0346769 | A1 | 11/2017 | McCray |
| 2018/0260395 | A1 | 9/2018 | Bakshi et al. |
| 2019/0361575 | A1 | 11/2019 | Ni et al. |
| 2019/0384415 | A1 | 12/2019 | Zeinali Zadeh Ranjhbar |
| 2023/0153525 | A1 | 5/2023 | Yim |

FOREIGN PATENT DOCUMENTS

| | | | |
|---|---|---|---|
| JP | 2014167815 | | 9/2014 |
| JP | 2018503191 | | 2/2018 |
| JP | 2018511095 | | 4/2018 |
| JP | 6348831 | | 6/2018 |
| JP | 6419993 | | 11/2018 |
| JP | 6606301 | | 11/2019 |
| KR | 20170106346 | | 9/2017 |
| KR | 102360926 | B1 * | 10/2017 |
| KR | 102360926 | | 2/2022 |
| WO | 2011096945 | | 8/2011 |
| WO | 2016111881 | | 7/2016 |
| WO | 2016118794 | | 7/2016 |
| WO | 2018204822 | | 11/2018 |
| WO | 2019098038 | | 5/2019 |
| WO | 2019173244 | | 9/2019 |
| WO | WO-2019173244 | A1 * | 9/2019 ......... G06F 16/9535 |
| WO | 2019216964 | | 11/2019 |

OTHER PUBLICATIONS

European Patent Office; Communication Pursuant to Rules 161(1) and 162 EPC issued in Application No. 21730751.1; 3 pages; dated Oct. 28, 2022.

Intellectual Property India; First Examination Report issued in Application No. 202227059250; 2 pages; dated Sep. 18, 2023.

Japan Patent Office; Notice of Reasons for Rejection issued in Application No. JP 2022-565888; 17 pages, dated Dec. 11, 2023.

European Patent Office; Communication Pursuant to Article 94(3) EPC issued in Application No. 21730751.1; 12 pages; dated Feb. 6, 2024.

Japan Patent Office; Notice of Reasons for Rejection issued in Application No. JP 2022-565888; 12 pages; dated Jun. 24, 2024.

The Korean Intellectual Property Office; Notice of Office Action issued in Application No. 1 10-20227039401; 17 pages; dated Sep. 19, 2024.

European Patent Office; Communication Pursuant to Article 94(3) EPC issued in Application No. 21730751.1; pages; dated Nov. 13, 2024.

\* cited by examiner

FULFILLMENT OF ACTIONABLE REQUESTS AHEAD OF A USER SELECTING A PARTICULAR AUTOCOMPLETE SUGGESTION FOR COMPLETING A CURRENT USER INPUT

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

In some instances, an automated assistant or other application may provide functionality for suggesting, to a user, certain commands for the user to issue to the automated assistant or application. However, oftentimes the suggestions rendered for the user may not be readily interactive because of some further operations that need to be performed. For example, in order to be responsive to a suggested command selected by the user, an application may need to retrieve data from one or more server computing devices or applications, and/or buffer certain data at the client computing device. This can add latency between a selection of a suggestion by the user and fulfillment of a request by the application. Such latency can result in certain resource-preserving actions being delayed to the detriment of other applications and/or computing devices. For example, a suggested command that corresponds to turning off an appliance may not be executed expeditiously after a user selects the suggested command. As a result, the appliance may continue to consume energy and/or other resources until a respective application fulfills the suggested command. Moreover, messages and/or other communications between users can be delayed as a result of such latency, thereby resulting in unintended schedule alterations and/or other consequences that can amount to loss of time and/or other resources.

SUMMARY

Implementations set forth herein relate to proactive fulfillment of actionable requests, when such requests correspond to autocomplete suggestions that are being presented for a user that has provided at least a partial input to a user interface. A partial input can be, for example, a portion of an input (e.g., "Turn on . . . ") provided to a text field interface of a computing device. A partial input can include one or more characters received at an interface of a computing device prior to an indication that a user has completed providing a corresponding input. An indication that a user has completed an input can be, but is not limited to, selection of a GUI element, interaction with a hardware button, providing a spoken input, providing tactile input, a threshold amount of time that has elapsed since a particular input, and/or any other interaction that can occur at a computing device. The partial input can be characterized by client data that is processed at a client computing device and also provided to a server computing device for processing. Each of the client computing device and the server computing device can rely on a respective natural language understanding (NLU) process (e.g., a client NLU process and a server NLU process). In some implementations, a server NLU process can be more robust than a client NLU process.

The client computing device can use, for example, a matching process in order to generate one or more autocomplete suggestions and/or other instances of natural language content from the partial input. Each autocomplete suggestion, when attached as an addendum to the partial input, can create a respective input command that is definite with respect to a particular application action(s) to be performed or a result to be achieved in response to a device and/or application receiving the respective input command. The client computing device can then render one or more selectable suggestions (e.g., a selectable GUI element and/or any other selectable suggestion element) at an interface of the client computing device, or another interface of another computing device, based on the autocomplete suggestions.

While the client computing device is rendering the selectable suggestions, the server computing device can process client data (e.g., the partial interface input and/or the one or more autocomplete suggestions) that was provided by the client computing device. The client data can be processed by the server computing device using a server NLU process, in furtherance of generating server suggestion data, which can include content corresponding to the autocomplete suggestions. The server suggestion data can then be communicated to the client computing device, which can process the server suggestion data in order to enhance features of the one or more selectable suggestions rendered at the client computing device. For example, when the client data includes an autocomplete suggestion such as, "Turn on the security lights," the server suggestion data can characterize content indicating a status of the security lights. The content can include graphical data, such as a light bulb icon and/or a light switch icon, which provides a visual indication of a current status of the security lights.

In some instances, the aforementioned processes can take place while the user is continuing to provide the rest of the partial input to the interface of the client computing device, or otherwise shortly after providing the partial input but prior to completing the input. During this time, the server computing device can identify and/or generate fulfillment data that can be used by the client computing device and/or one or more client applications to fulfill one or more actionable requests corresponding to each respective selectable suggestion. For example, a particular selectable suggestion identified by the server computing device can be "Turn on the security lights." Fulfillment data corresponding to this particular selectable suggestion can characterize a current operating status of the "security lights" and/or an embedded link that, when executed, causes a request for turning on the security lights to be issued to an application or a controller that controls the security lights.

When the server computing device has generated the fulfillment data, the fulfillment data can be communicated to the client computing device for proactively fulfilling one or more selectable suggestions prior to a user selecting any of the selectable suggestions. When the client computing device receives the fulfillment data, each respective portion of the fulfillment data can be stored in association with one or more corresponding selectable suggestions. For example, a selectable suggestion that is labeled with natural language content such as "Turn on the security lights" can be linked to a portion of the fulfillment data that characterizes the embedded link for turning on certain security lights that the user may be referring to. Additionally, or alternatively, another selectable suggestion that is labeled with other natural language content, such as "Turn on the air purifier," can be associated with another portion of the fulfillment data that characterizes command data for causing a Wi-Fi-enabled air purifier to turn on. In some instances, the fulfillment data can be linked or otherwise associated with multiple different selectable suggestions while providing the user input and/or prior to the user selecting one or more of the selectable suggestions.

As a result, latency between a user selecting a particular selectable suggestion and a corresponding action(s) being initialized and/or completed can be reduced. For example, by proactively retrieving the embedded link for a particular selectable suggestion, the client computing device can bypass an operation(s) of requesting the embedded link from the server computing device after the user has selected the particular selectable suggestion. Bypassing this operation subsequent to receiving a selection of a selectable suggestion can also reduce an amount of network bandwidth and processing bandwidth that is consumed in response to receiving the selectable suggestion. Furthermore, bypassing this operation can also preserve computational resources for subsequent application processes, which may be initialized when a user provides a sequence of requests to an application, such as an automated assistant.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
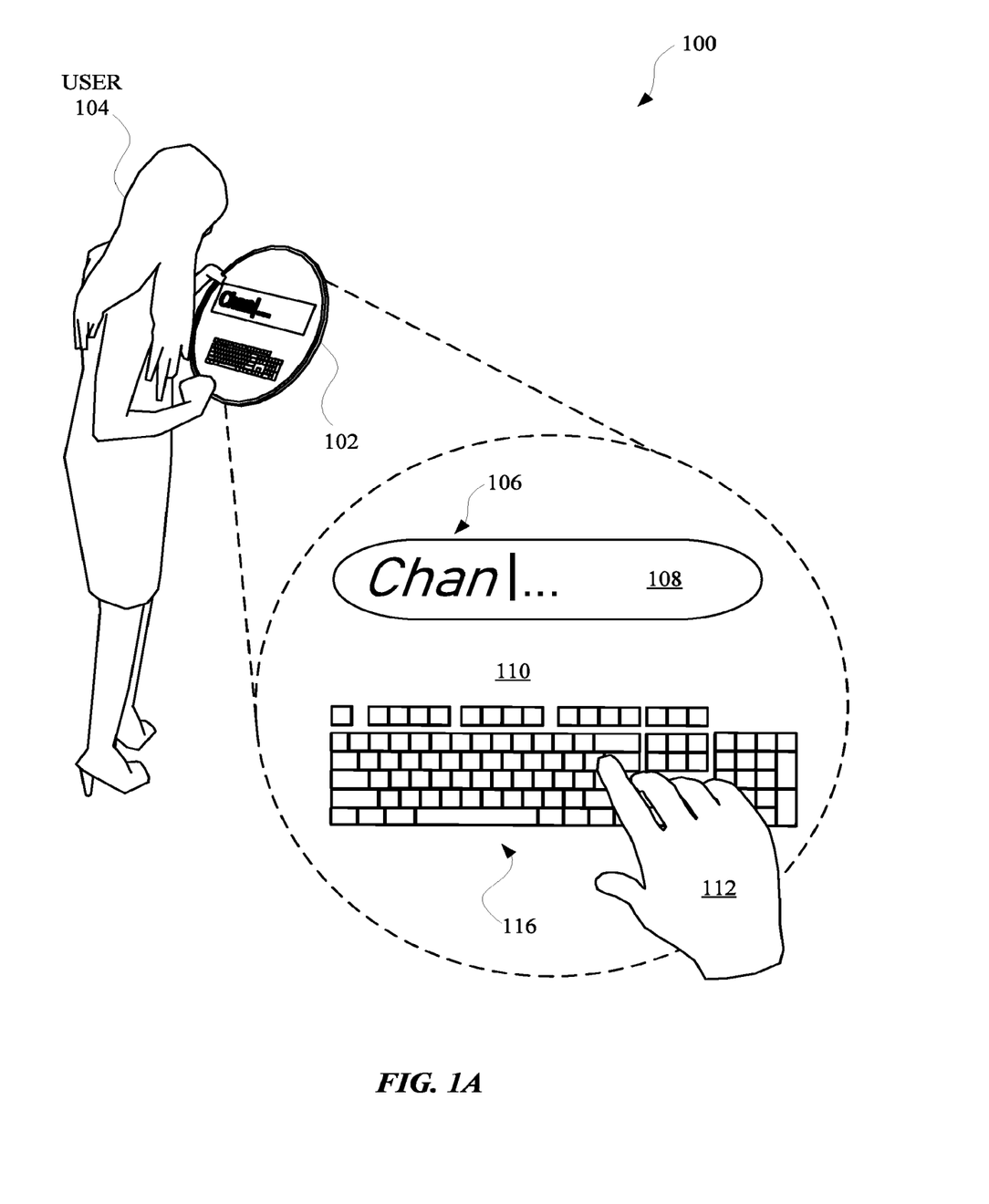
FIG. 1A, FIG. 1B, and FIG. 1C illustrate views of a user interacting with an interface that provides pro-actively fulfilled, selectable, autofill suggestions.
Figure 1B:
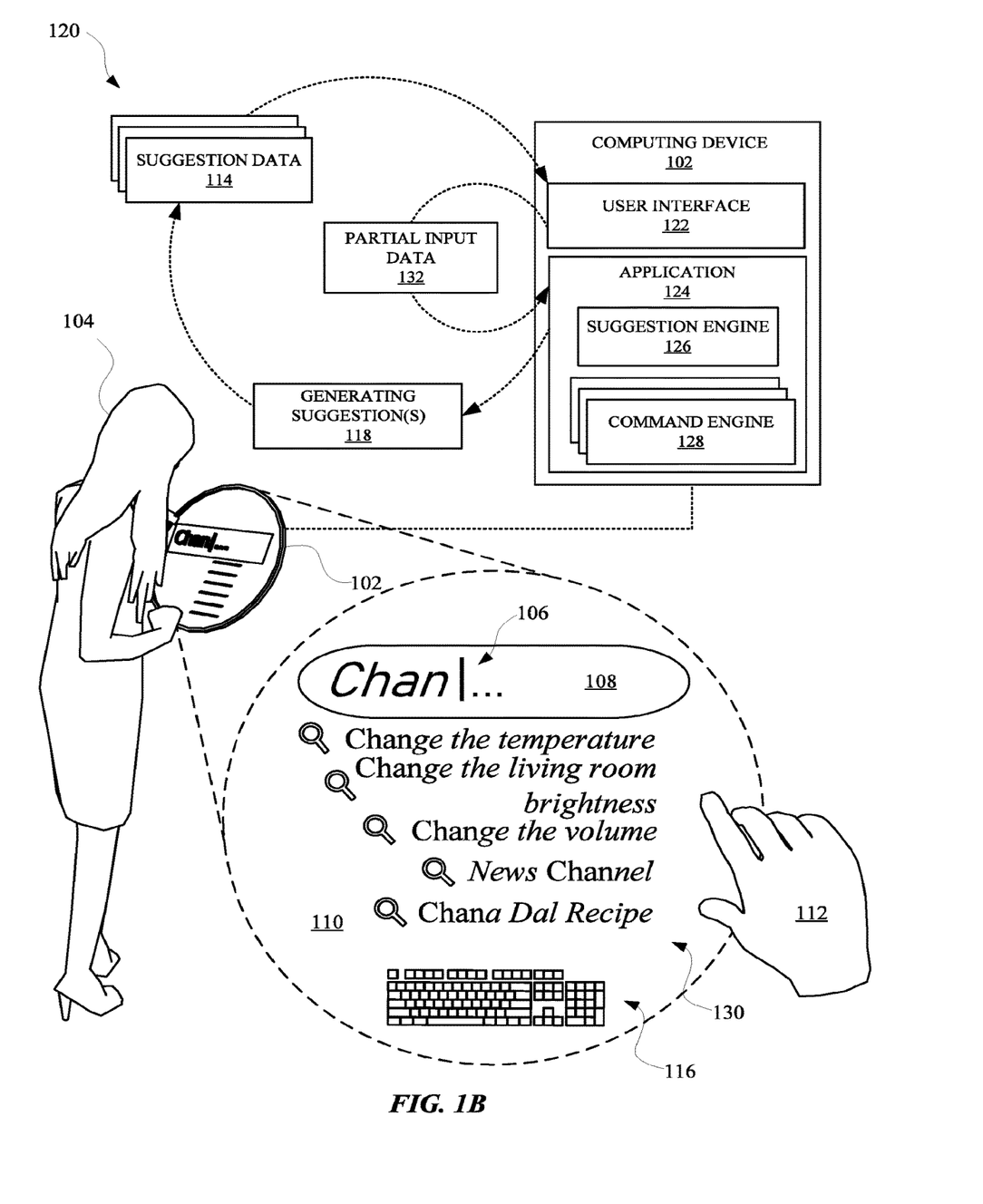
Figure 1C:
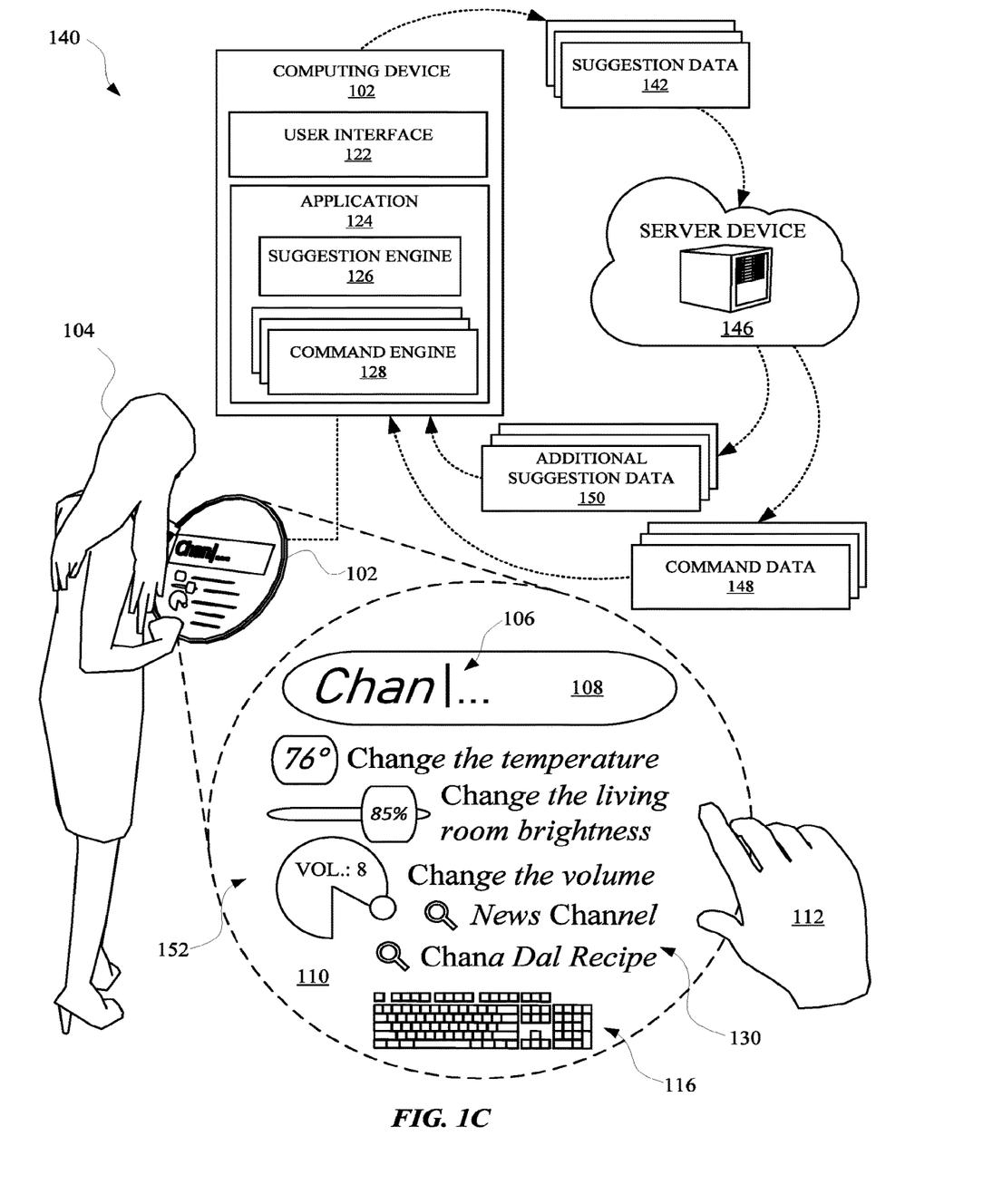

FIG. 1A, FIG. 1B, and FIG. 1C illustrate a view 100, a view 120, and a view 140 of a user 104 interacting with an interface 110 that provides pro-actively fulfilled, selectable, autofill suggestions. Each autofill suggestions can correspond to a respective application action that can be proactively fulfilled before the user 104 selects a respective autofill suggestion. One or more processes for proactively initializing and/or for fulfilling an application action can employ a remote server device that processes one or more autofill suggestions in order to generate command data that can be used to fulfill and/or initialize a particular action. For example, as provided in view 100 of FIG. 1A, the user 104 can provide a partial input 106 to a text field 108 being rendered at an interface 110 of a computing device 102. The partial input 106 can be, for example, "Chan . . . ", which can include one more characters that are intended by the user 104 to be an initial portion of a natural language input (e.g., an assistant command such as "Chan[ge the temperature]"). The partial input 106 can be considered "partial" when the user 104 has not: completed typing or otherwise providing the input, selected to submit the input to an application for processing, provided additional input for a threshold period of time, and/or otherwise indicated that the partial input 106 is incomplete relative to a subsequent input that the user 104 intends to provide (e.g., provide via a spoken utterance and/or a keyboard 116 that can receive touch inputs from a hand 112 of the user 104).

FIG. 1B illustrates a view 120 the computing device 102 receiving the partial input 106, and communicating partial input data 132 from a user interface 122 to an application 124, such as an automated assistant. The computing device 102 and/or the application 124 can include a suggestion engine 126, which can perform a process of generating autofill suggestions 118 that is characterized by generating suggestion data 114, which can be rendered at the user interface 122. A process for generating autofill suggestions can include correlating the partial input 106 to one or more previous inputs provided by the user 104 and/or one or more other users. Alternatively, or additionally, a process for generating autofill suggestions can include processing the partial input data 132 using one or more trained machine learning models. Each autofill suggestion can then be ranked or otherwise prioritized based on other data that is accessible to the computing device 102. This other data can be, for example, contextual data and/or application data that characterizes, with prior permission from the user 104, one or more interactions that have occurred, or are occurring, between the user 104 and the computing device 102.

In some implementations, one or more autofill suggestions that are ranked or designated as prioritized over one or more other autofill suggestions can be communicated to a server device 146, prior to the user 104 selecting a particular autofill suggestion of one or more autofill suggestions 130 rendered at the interface 110. For example, as illustrated in view 140 of FIG. 1C, the computing device 102 can communicate suggestion data 142 to the server device 146. The suggestion data 142 can characterize one or more autofill suggestions generated at the computing device 102. In some implementations, the suggestion data 142 can characterize a subset of the autofill suggestions generated by a suggestion engine 126 of the application 124. The subset of the autofill suggestions can include, but is not limited to, one or more highest prioritized autofill suggestions of the autofill suggestions 130.

In response to receiving the suggestion data 142, the server device 146 can generate additional suggestion data 150 and/or command data 148, as provided in view 140 of FIG. 1C. The additional suggestion data 150 and/or the command data 148 can be received by the computing device 102 after the autofill suggestions 130 are rendered at the interface 110—but before the user 104 selects one or more of the autofill suggestions. For example, the user 104 may continue to provide input using the keyboard 116, even while the autofill suggestions 130 are rendered at the interface 110—and, even after the additional suggestion data 150 and the command at 148 are received from the server device 146. When the computing device 102 and/or the application 124 receives the command data 148, the application 124 and/or one or more other applications can access the command data 148 in furtherance of fulfilling one or more application actions associated with the autofill suggestions 130. For example, a smart thermostat application can access the command data 148 in preparation for fulfilling a temperature change action corresponding to the autofill suggestion "change the temperature." Alternatively, or additionally, a smart home application can access the command data 148 in preparation for receiving instructions from the application 124 for changing brightness of lights in a home of the user 104. These instructions can correspond to the autofill suggestion: "Change the living room brightness."

In some implementations, the server device 146 can provide the additional suggestion data 150, which can include content that can be rendered at the interface 110. The content can be, but is not limited to, graphical data, audio data, and/or other data that the user 104 can be used to effectuate completion of one or more application actions associated with the autofill suggestions 130. For example, additional suggestion data 150 can be one or more interactive GUI elements 152, such as a slide bar and/or a rotatable dial. These GUI elements can be selected by the server device 146 using these suggestion data 142 and/or other data that is accessible to the server device. In some implementations, the server device 146 can access status data associated with a particular device and/or application in order to generate a GUI element that characterizes the status of a particular device and/or application. For example, in response to receiving the suggestion data 142, the server device 146 can access status data or other content, and generate the additional suggestion data 150 to characterize the status data or other content. In some instances, a speaker that is accessible to the computing device 102 can be rendering audio at a volume level of "8," and therefore the server device 146 can generate the additional suggestion data 150 as characterizing the volume level (e.g., an adjustable dial set at "8," as depicted in FIG. 1C.

In other instances, a thermostat that is accessible to the computing device 102 can be set at a temperature of 76 degrees, and therefore the server device 146 can generate the additional suggestion data 150 characterizing the temperature (e.g., an editable text field with "76°" occupying the editable text field). In some instances, content from the internet can be accessed based on the suggestion data 142, in order to provide additional content that can characterize a particular autofill suggestion. For example, an image of an entree retrieved from the internet can be stored in association with an autofill suggestion corresponding to a recipe (e.g., "Chana Dal Recipe). In this way, the user 104 can more readily identify a purpose for a particular autofill suggestion, and a portion of an internet web page (e.g., graphical content characterizing the entree) can already be buffered in memory of the computing device 102 prior to the user 104 selecting the particular autofill suggestion.

In some implementations, each autofill suggestion 130 and/or each interactive GUI element can be stored in association with the command data 148, which can include embedded links, network data for establishing a connection to another device(s), media, and/or any other data that can be accessed when an application is performing one or more actions. For example, when the autofill suggestions include, "change the living room brightness," the command data 148 can include network connection data that can be accessed by the application 124 and/or any other application, in order to establish a communication channel between a computing device 102 and one or more smart lights in a home of the user 104. By providing such command data 148 before the user 104 selects a particular autofill suggestion, computational resources associated with fulfilling one or more actions for the autofill suggestions can be preserved. For example, latency between user selection and action fulfillment can result in processing bandwidth and network bandwidth being limited for a period of time. Furthermore, such restrictions on bandwidth can consume charge storage, which can be limited in certain portable electronics.

Figure 2:
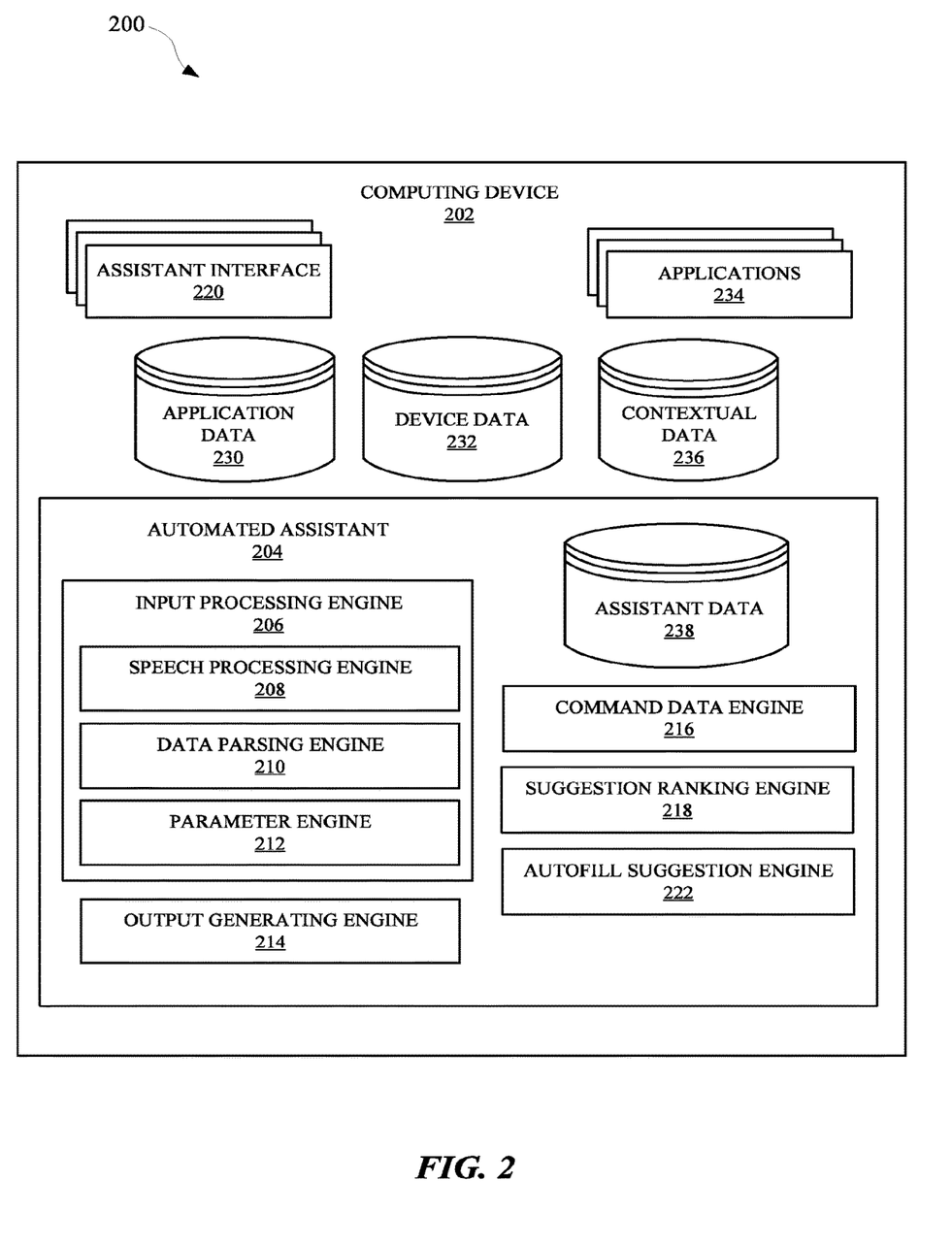
FIG. 2 illustrates a system that provides selectable suggestions corresponding to automated assistant actions and/or application actions that are at least partially fulfilled using command data, which is provided by a server device prior to a user selecting a particular selectable suggestion.

FIG. 2 illustrates a system 200 that provides selectable suggestion corresponding to automated assistant actions and/or application actions that are at least partially fulfilled using command data, which is provided by a server device prior to a user selecting a particular selectable suggestion. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204.

The computing device 202 can include a display device, which can be a display panel that includes a touch interface for receiving touch inputs and/or gestures for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input (e.g., a partial input or a complete input) that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize a current operating state of each application 234 executing at the computing device 202. Furthermore, the application data 230 can characterize one or more features of an executing application 234, such as content of one or more interfaces being rendered at the direction of one or more applications 234. Alternatively, or additionally, the application data 230 can characterize an action schema, which can be updated by a respective application and/or by the automated assistant 204, based on a current operating status of the respective application and/or a respective application action. Alternatively, or additionally, one or more action schemas for one or more applications 234 can remain static, but can be accessed by the application state engine in order to determine a suitable action to initialize via the automated assistant 204.

In some implementations, the computing device 202 can include an autofill suggestion engine 222 that can process various inputs received at the assistant interface 220 and/or any other computing device. For example, a user can begin providing a typed input (e.g., one or more natural language characters) to a text field being rendered at an interface of the computing device 202. In response to the user providing a partially typed input, the autofill suggestion engine 222 can identify one or more autofill suggestions that characterize one or more strings of characters. When the one or more strings of characters are sequentially combined with the partially typed user input, a word or phrase that is actionable by the automated assistant 204 and/or another application 234 is created. Each autofill suggestion identified by the autofill suggestion engine 222 can be rendered at a graphical user interface of the computing device 202, and each autofill suggestion can be selectable prior to a user finishing typing their typed input.

In some implementations, the computing device 202 and/or the automated assistant 204 can communicate each autofill suggestion to a server computing device prior to a user finishing typing their typed input. The server computing device can process each autofill suggestion in furtherance of generating additional autofill suggestion content and/or command data associated with each respective autofill suggestion. The computing device 202 and/or the automated assistant 204 can include a command data engine 216 that can process command data received from the server computing device. The command data engine 216 can process the command data prior to a user selecting a particular autofill suggestion. In some instances, processing of the command data can include providing access to one or more respective applications 234 to the command data. For example, the command data can include certain fulfillment data that a particular application 234 can use in order to fulfill an application action associated with a particular autofill suggestion, prior to a user selecting the particular autofill suggestion. Additionally, or alternatively, the command data can include assistant command fulfillment data that the automated assistant 204 can use in order to fulfill an assistant action associated with a particular autofill suggestion, prior to a user selecting the particular autofill suggestion.

In some implementations, the first priority data can be generated by the suggestion ranking engine 218 using the application data 230, the device data 232 and/or the contextual data 236. For example, a current context of the user and/or the computing device 202 when the user provides the user input can be a basis for assigning a higher priority to a first autofill suggestion and a lower priority to a second autofill suggestion. Additionally, the second priority data can be generated by a suggestion ranking engine at the server computing device using historical interaction data that is based on one or more previous interactions between one or more users and one or more applications and/or devices. For example, an autofill suggestion that is associated with an application that is more frequently used by one or more users can be prioritized higher than an autofill suggestion that is associated with another application that is less frequently used by one or more users. Thereafter, third priority data generated by the suggestion ranking engine 218 can be based on the first priority data and the second priority data. For example, when a particular autofill suggestion is ranked highest by the first priority data and the second priority data, the third priority data can also rank that particular autofill suggestion highest. However, when a particular autofill suggestion is ranked highest in the first priority data but not in the second priority data, additional processing can be employed in order to establish a final ranking for the particular autofill suggestion. For instance, any additional input that has been provided by the user subsequent to an initial input that was a basis for the set of autofill suggestions can be used as a basis for establishing the final ranking for the particular autofill suggestion.

In some instances, when a partial input provided by a user is associated with rendering of media data, the server computing device can rank certain autofill suggestions higher based on information that is more readily available to the server computing device. For example, the server computing device can have access to information about newly released movies or music prior to the computing device 202 having access to such information. Therefore, when a server ranking of an autofill suggestion is substantially higher than a client ranking of the autofill suggestion, this can be attributed to limited network access by the computing device 202 and/or more robust data that is available to the server computing device.

Figure 3A:
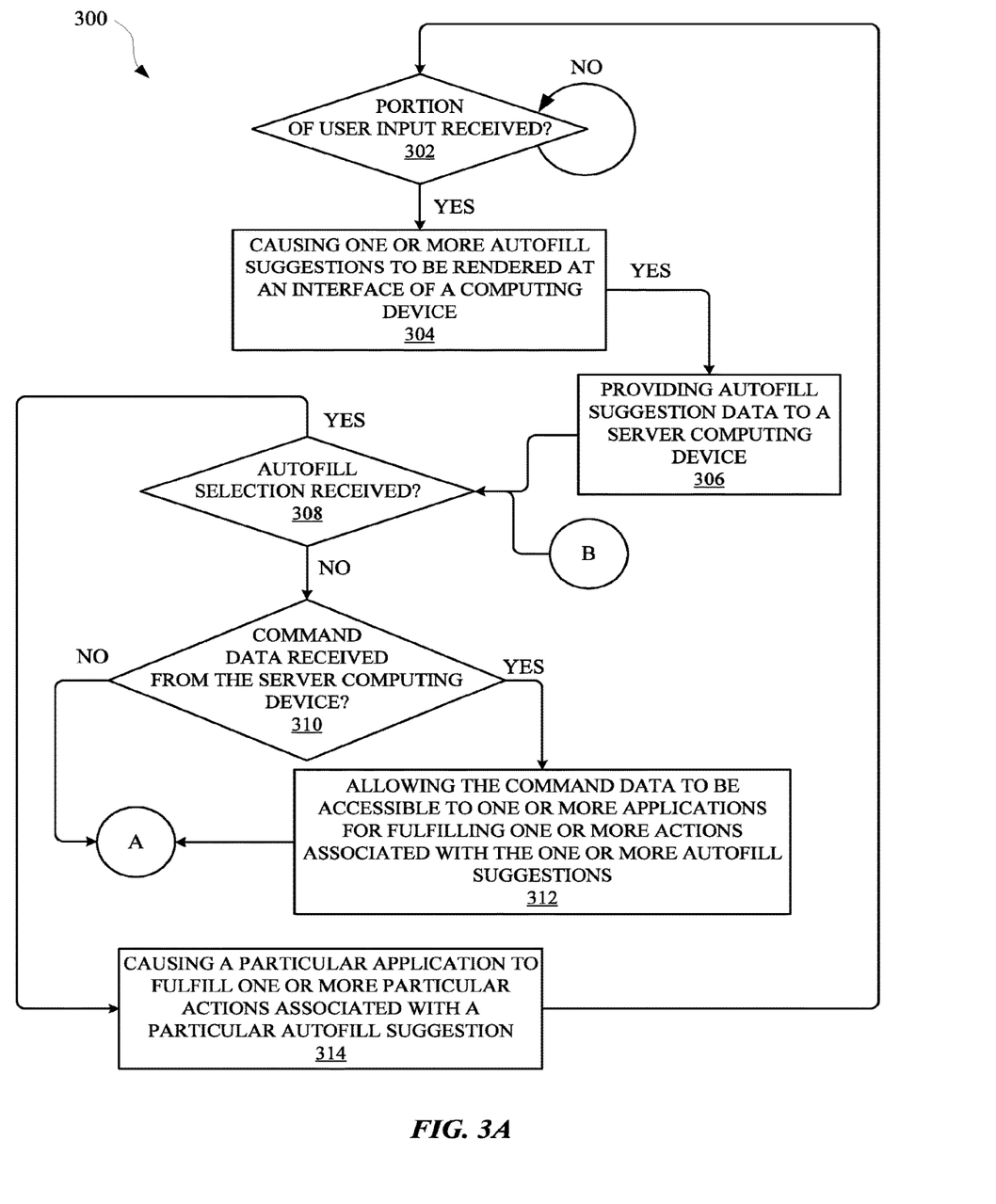
FIG. 3A and FIG. 3B illustrate a method for proactively initializing, prior to a user selection, fulfillment of one or more actions suggested to a user, in response to a user providing at least a partial input to an interface of a computing device.
Figure 3B:
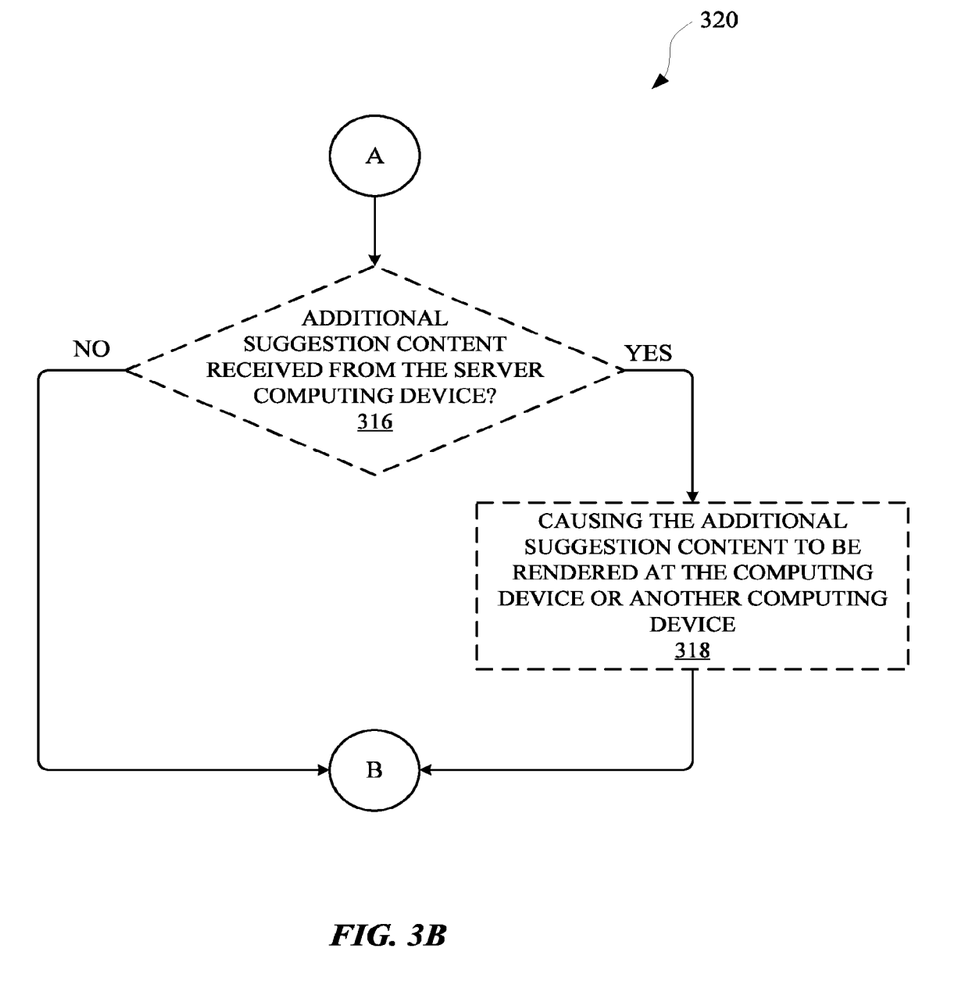

FIG. 3A and FIG. 3B illustrate a method 300 and a method 320 for proactively initializing, prior to a user selection, fulfillment of one or more actions suggested to a user, in response to a user providing at least a partial input to an interface of a computing device. The method 300 and the method 320 can be performed by one or more applications, devices, and/or any other apparatus for module capable of being responsive to user input. The method 300 can include an operation 302 of determining whether a portion of user input has been received at a computing device. The user input can be a textual input comprising one or more characters received at an input field of an application interface. Therefore, a portion of user input can be any portion of an input that a user has not indicated is complete, either directly or indirectly, and/or expressly or inherently.

When a portion of a user input is received, the method 300 can proceed from the operation 302 to an operation 304. Otherwise, the computing device or other application can determine whether a portion of a user input has been received. The operation 304 can include causing one or more autofill suggestions to be rendered at an interface of a computing device. For example, an autofill suggestion can be an addendum to a portion of the user input. The addendum can include natural language content that, when provided to the computing device with the portion of the user input, causes the computing device to perform one or more actions. For instance, the portion of the input can be "Disable my . . . " and an autofill suggestion can be "security system" or "dishwasher." In this way, a combination of the partial input and an autofill suggestion—when provided as a spoken or typed input to the computing device, can correspond to a complete command that is actionable by the computing device.

The method 300 can proceed from the operation 304 to an operation 306, which can include providing autofill suggestion data to a server computing device. The autofill suggestion data can characterize one or more autofill suggestions generated at the computing device in response to the user input. The computing device can provide the autofill suggestion data to the server computing device in order to benefit from additional computational resources and/or information available at the server computing device. For example, the server computing device can have access to cloud storage services that can be used as a basis for generating additional autofill suggestion data and/or command data. The autofill suggestion data and/or the command data can be provided to the computing device and/or processed by the computing device prior to a user selecting a particular autofill suggestion that is being rendered at an interface of a computing device.

The method 300 can proceed from the operation 306 to an operation 308, which can include determining whether an autofill suggestion was received at the computing device. When an autofill suggestion has been received at the computing device, the method 300 can proceed to an operation 314. The operation 314 can include causing a particular application to fulfill one or more particular actions associated with a selected autofill suggestion. For example, an autofill suggestion such as, "dishwasher," can be selected by the user and, in response, a smart device application (e.g., IoT device application) can communicate the command to a smart dishwasher in order to cause the dishwasher to be disabled.

However, when an autofill selection is not received at the operation 308, the method 300 can proceed to an operation 310. The operation 310 can include determining whether command data has been received from the server computing device. The command data can be data that can be used by an application in order to at least partially fulfill an application action associated with a particular autofill suggestion, prior to a user selecting the particular autofill suggestion. The command data can include, but is not limited to, an embedded link that is typically retrieved and/or executed by an application in order to modify an operation of a smart device. In some instances, the command data can include various fulfillment data for fulfilling one or more application actions corresponding to each of one or more respective autofill suggestions.

When command data is received from the server computing device, the method 300 can proceed to an operation 312. Otherwise, the method 300 can proceed from the operation 310, via continuation element "A" to continuation element "A" provided at method 320 of FIG. 3B. The operation 312 can include allowing the command data to be accessible to one or more applications for fulfilling one or more actions associated with the one or more autofill suggestions. When a particular application has access to the command data, the particular application can operate in furtherance of initializing fulfillment of one or more actions associated with an autofill suggestion, prior to the user selecting the autofill suggestion. The method 300 can then proceed from the operation 312, via continuation element "A," to an optional operation 316 provided in method 320 of FIG. 3B. The operation 316 can include determining whether additional suggestion content has been received from the server computing device. The additional suggestion content can include data that can be rendered with one or more autofill suggestions in order to provide additional information to a user that may be viewing the one or more autofill suggestions. For example, additional suggestion content can include graphical content that can characterize a status of a particular device associated with a particular autofill suggestion. For instance, the additional suggestion content can be a graphical animation depicting a dishwasher actively cleaning dishes. Therefore, such information can provide a context from which a user can further narrow down their decision to select a particular autofill suggestion from multiple different autofill suggestions. Alternatively, or additionally, the additional suggestion content can include media data that can be rendered at the computing device in order to further characterize various different autofill suggestions being suggested to the user.

When additional content is received from the server computing device, the method 320 can optionally proceed from the operation 316 to an operation 318. Otherwise, the method of 320 can proceed from optional operation 316, via continuation element "B," to the operation 308. The operation 318 can include causing the additional suggestion content to be rendered at the computing device or another computing device. By causing the additional suggestion content to be rendered, each autofill suggestion can be enhanced by content that supplements any information associated with a respective autofill suggestion. In some instances, this can reduce latency between a user selecting on autofill suggestion and one or more actions being completed in response to the autofill suggestion. For example, when the additional suggestion content includes graphical content characterizing a preview of a video being suggested, some amount of video would be buffered into memory of a computing device prior to a user selecting a corresponding autofill suggestion. Such reductions in latency can be useful in situations in which a user is seeking to view security footage from a security camera and/or accessing other related smart home devices.

The method can proceed from the operation 318, via continuation element "B," to the operation 308 provided in FIG. 3A and, thereafter, the method 300 can then continue from the operation 308 accordingly. For example, when the user selects an autofill suggestion such as "Disable my . . . dishwasher," the method 300 can proceed to the operation 314 for causing a particular application to fulfill one or more actions associated with disabling a "dishwasher." The particular application can be a smart home application for controlling various devices that are Wi-Fi-enabled in a home of the user. The particular application can have access to certain command data prior to the suggestion selection by the user, and the certain command data can characterize one or more actions executable by a module executing at the Wi-Fi-enabled dishwasher. For instance, the command data can include an embedded link that has been accessed by the particular application or another application (e.g., an automated assistant application) prior to the user selecting the autofill suggestion.

Figure 4:
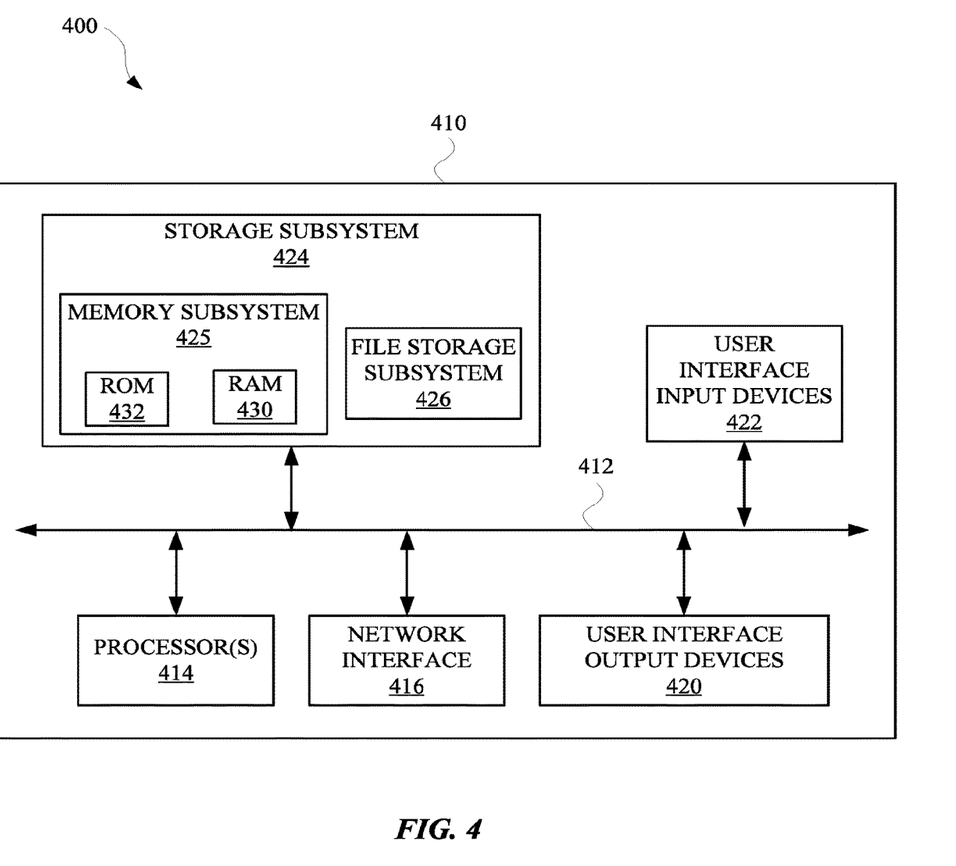
FIG. 4 is a block diagram of an example computer system.

FIG. 4 is a block diagram 400 of an example computer system 410. Computer system 410 typically includes at least one processor 414 which communicates with a number of peripheral devices via bus subsystem 412. These peripheral devices may include a storage subsystem 424, including, for example, a memory 425 and a file storage subsystem 426, user interface output devices 420, user interface input devices 422, and a network interface subsystem 416. The input and output devices allow user interaction with computer system 410. Network interface subsystem 416 provides an interface to outside networks and is coupled to corresponding interface devices in other computer systems.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 410 or onto a communication network.

User interface output devices 420 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 410 to the user or to another machine or computer system.

Storage subsystem 424 stores programming and data constructs that provide the functionality of some or all of the modules described herein. For example, the storage subsystem 424 may include the logic to perform selected aspects of method 300, method 320, and/or to implement one or more of system 200, computing device 102, server device 146, and/or any other application, device, apparatus, and/or module discussed herein.

These software modules are generally executed by processor 414 alone or in combination with other processors. Memory 425 used in the storage subsystem 424 can include a number of memories including a main random access memory (RAM) 430 for storage of instructions and data during program execution and a read only memory (ROM) 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 424, or in other machines accessible by the processor(s) 414.

Bus subsystem 412 provides a mechanism for letting the various components and subsystems of computer system 410 communicate with each other as intended. Although bus subsystem 412 is shown schematically as a single bus, alternative implementations of the bus subsystem may use multiple busses.

Computer system 410 can be of varying types including a workstation, server, computing cluster, blade server, server farm, or any other data processing system or computing device. Due to the ever-changing nature of computers and networks, the description of computer system 410 depicted in FIG. 4 is intended only as a specific example for purposes of illustrating some implementations. Many other configurations of computer system 410 are possible having more or fewer components than the computer system depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as receiving, at an interface of a client computing device, a user input that includes one or more natural language characters. The method can further include an operation of causing, based on at least a portion of the user input, a selectable graphical user interface (GUI) element to be rendered at a display interface of the client computing device, wherein the selectable GUI element includes natural language content characterizing an autofill suggestion for the user input. The method can further include an operation of providing, to a server computing device from the client computing device, the autofill suggestion. The method can further include an operation of, subsequent to causing the selectable GUI element to be rendered at the display interface, but prior to receiving a user selection of the selectable GUI element: receiving, from the server computing device, command data that is generated based on the autofill suggestion, wherein the command data is accessible by one or more applications in furtherance of fulfilling one or more actions associated with the selectable GUI element. The method can further include an operation of receiving, subsequent to receiving the command data, the user selection of the selectable GUI element. The method can further include an operation of causing, in response to receiving the user selection of the selectable GUI element, the one or more applications to initiate performance of the one or more actions using the command data.

In some implementations, the method can further include an operation of receiving, from the server computing device, additional suggestion content that is based on the autofill suggestion for the user input. The method can further include an operation of causing, prior to receiving the user selection of the selectable GUI element, the additional suggestion content to be rendered at the display interface with the selectable GUI element. In some implementations, the method can further include an operation of causing, based on at least the portion of the user input, an additional selectable GUI element to be rendered at the display interface of the client computing device, wherein the additional selectable GUI element includes additional natural language content characterizing an additional autofill suggestion for the user input. In some implementations, the method can further include an operation of providing, to the server computing device from the client computing device, the additional autofill suggestion, wherein the command data received from the server computing device is also based on the additional autofill suggestion. In some implementations, the method can further include an operation of, subsequent to causing the selectable GUI element and the additional selectable GUI element to be rendered at the display interface, but prior to receiving the user selection of the selectable GUI element: determining, at the client computing device, a respective priority for each of the selectable GUI element and the additional selectable GUI element, wherein each respective priority is based on historical interaction data that characterizes one or more previous interactions between a user and the one or more applications.

In some implementations, each respective priority is further based on other historical interaction data that characterizes one or more other previous interactions between one or more other users and the one or more applications. In some implementations, the command data is received from the server computing device while the user is providing an additional portion of the user input. In some implementations, the one or more applications include an automated assistant that is responsive to natural language input at one or more interfaces of the client computing device. In some implementations, the method can further include an operation of, subsequent to causing the selectable GUI element to be rendered at the display interface, but prior to receiving the user selection of the selectable GUI element: causing the one or more applications to execute a function for buffering a portion of the command data that is to be rendered via the client computing device in response to a user selecting the selectable GUI element. In some implementations, providing the autofill suggestion to the server computing device includes: causing the server computing device to generate the command data using the autofill suggestion and a server natural language understanding (NLU) process, wherein the server NLU process is different from a client NLU process that is performed at the client computing device.

In other implementations, a method implemented by one or more processors is set forth as including operations such as receiving, by a server computing device and from a client computing device, client data characterizing one or more autofill suggestions for a partial interface input received at the client computing device, wherein the client computing device renders the one or more autofill suggestions in response to the partial interface input at the client computing device. In some implementations, the method can further include an operation of generating, based on the one or more autofill suggestions, command data that characterizes one or more application actions capable of being initialized at the client computing device by one or more respective applications. In some implementations, the method can further include an operation of, prior to a user selecting, at the client computing device, a particular autofill suggestion of the one or more autofill suggestions: providing the command data to the client computing device, wherein, in response to receiving the command data, the client computing device causes a particular application of the one or more respective applications to access the command data in preparation for fulfilling a particular application action of the one or more application actions.

In some implementations, the method can further include an operation of generating, at the server computing device, additional suggestion content that is based on the one or more autofill suggestions. In some implementations, the method can further include an operation of, prior to the user selecting, at the client computing device, the particular autofill suggestion of the one or more autofill suggestions: causing the additional suggestion content to be rendered via an interface of the client computing device. In some implementations, the command data is received by the client computing device while the user is providing an additional input to append the partial interface input. In some implementations, the one or more respective applications include an automated assistant that is responsive to natural language input at one or more interfaces of the client computing device. In some implementations, causing the particular application of the one or more respective applications to access the command data in preparation for fulfilling the particular application action of the one or more application actions includes: causing the particular application to render a portion of the command data via one or more interfaces of the client computing device.

In yet other implementations, a method implemented by one or more processors is set forth as including operations such as receiving, at an interface of a client computing device, a user input characterizing a portion of an assistant command directed to an automated assistant, wherein the automated assistant is responsive to spoken utterances received at the client computing device. The method can further include an operation of identifying, in response to receiving the user input, autofill suggestions based on the portion of the assistant command. The method can further include an operation of generating, based on the autofill suggestions, client command data that characterizes each assistant action that is responsive to each autofill suggestion of the autofill suggestions. The method can further include an operation of communicating, by the client computing device, the autofill suggestions to a server computing device via a network connection, wherein, based on the server computing device receiving the autofill suggestions, the server computing device performs operations that include: generating server command data that characterizes each additional assistant action that is responsive to each autofill suggestion of the autofill suggestions, and providing the server command data to the client computing device. The method can further include an operation of causing, by the client computing device, one or more selectable suggestion elements to be rendered at the interface or another interface of the client computing device, wherein each selectable suggestion element of the one or more selectable suggestion elements includes respective content that is based on the autofill suggestions. The method can further include an operation of subsequent to the client computing device rendering the one or more selectable suggestion elements, but prior to a user selecting a particular selectable suggestion element of the one or more selectable suggestion elements: receiving, from the server computing device, assistant command fulfillment data, wherein the assistant command fulfillment data is accessed by the automated assistant in furtherance of fulfilling one or more assistant actions or fulfilling one or more additional assistant actions.

In some implementations, the assistant command fulfillment data is received from the server computing device while the user is providing an additional portion of the assistant command. In some implementations, the method can further include an operation of, subsequent to the client computing device rendering the one or more selectable suggestion elements, but prior to the user selecting the particular selectable suggestion element of the one or more selectable suggestion elements: modifying a respective selectable suggestion of the one or more selectable suggestion elements based on the additional portion of the assistant command is being provided by the user. In some implementations, the method can further include an operation of, subsequent to the client computing device rendering the one or more selectable suggestion elements, but prior to the user selecting the particular selectable suggestion element of the one or more selectable suggestion elements: receiving, from the server computing device, additional suggestion content that is based on the autofill suggestion; and causing the additional suggestion content to be rendered via the interface or the other interface of the client computing device.

In some implementations, wherein the additional suggestion content includes graphical content that is rendered at the interface or the other interface of the client computing device, and wherein the graphical content characterizes a status of an operation being performed by a particular application that is associated with a particular autofill suggestion of the autofill suggestions. In some implementations, the method can further include an operation of, subsequent to the client computing device rendering the one or more selectable suggestion elements, but prior to the user selecting a particular selectable suggestion element of the one or more selectable suggestion elements: causing the automated assistant to complete a particular assistant action of the one or more additional assistant actions using the assistant command fulfillment data. In some implementations, communicating the autofill suggestions to the server computing device via the network connection includes: causing the server computing device to generate the assistant command fulfillment data using the autofill suggestions and a server natural language understanding (NLU) process, wherein the server NLU process is different from a client NLU process that is performed at the client computing device.

In yet other implementations, a method implemented by one or more processors is set forth as including operations such as receiving, at an interface of a client computing device, a user input characterizing a portion of an assistant command directed to an automated assistant, wherein the automated assistant is responsive to spoken utterances received at the client computing device. The method can further include an operation of identifying, in response to receiving the user input, autofill suggestions based on the portion of the assistant command. The method can further include an operation of generating, based on the autofill suggestions, client command data that characterizes each assistant action that is responsive to each autofill suggestion of the autofill suggestions. The method can further include an operation of selecting, based on the client command data, a first set of assistant actions from the client command data, wherein the first set of assistant actions is a subset of assistant actions identified in the client command data, and wherein the first set of assistant actions are selected further based on historical client data that characterizes previous interactions between a user and the automated assistant at the client computing device. The method can further include an operation of communicating, by the client computing device, the autofill suggestions to a server computing device via a network connection, wherein, in response to the server computing device receiving the portion of the assistant command, the server computing device performs operations that include: generating server command data that characterizes each additional assistant action that is responsive to each autofill suggestion, and selecting a second set of assistant actions from the server command data. In some implementations, the second set of assistant actions is another subset of assistant actions identified by the server command data, and the second set of assistant actions is identified based on server data that characterizes previous interactions between one or more others users and the automated assistant. In some implementations, the method can further include an operation of causing, to be initialized, performance of a particular assistant action identified in the first set of assistant actions and another particular assistant action in identified in the second set of assistant actions.

I claim:

1. A method implemented by one or more processors of a client device, the method comprising:
   receiving, via the client device, a first user input, the first user input being a partial user input that includes one or more natural language characters;
   in response to receiving the partial user input via the client device:
     determining one or more autofill suggestions based on the one or more natural language characters,
     causing the one or more autofill suggestions to be displayed at a user interface of the client device, the one or more autofill suggestions suggesting one or more application actions performable by one or more applications, and
     communicating autofill suggestion data that characterizes a subset of the autofill suggestions to a server device, the subset of the autofill suggestions being selected from the one or more autofill suggestions and suggesting a subset of application actions from the one or more application actions;
   receiving, from the server device, additional suggestion content generated by the server device based on the autofill suggestion data that characterizes the subset of the autofill suggestions, wherein the additional suggestion content supplements the subset of the autofill suggestions; and
   after initial display of the one or more autofill suggestions and prior to receiving a second user input that selects any of the one or more autofill suggestions, causing the additional suggestion content to be displayed with respect to the subset of autofill suggestions, at the user interface of the computing device, to supplement the subset of autofill suggestions.

2. The method of claim 1, further comprising:
   ranking the one or more autofill suggestions; and
   selecting one or more top ranked autofill suggestions from the ranked one or more autofill suggestions as the subset of the autofill suggestions.

3. The method of claim 2, wherein ranking the one or more autofill suggestions is based on data accessible to the client device, the data accessible to the client device including contextual data or application data that characterizes one or more interactions that have occurred, or are occurring between a user of the client device and the client device.

4. The method of claim 2, wherein the one or more autofill suggestions include a first autofill suggestion and a second autofill suggestion, and the first autofill suggestion associated with an application more frequently used than an application associated with the second autofill suggestion is ranked higher than the second autofill suggestion.

5. The method of claim 1, wherein the additional suggestion content includes graphical content that indicates a current status of a device that is controllable by a first application, of the one or more applications, that corresponds to a first autofill suggestion from the subset of the autofill suggestions.

6. The method of claim 5, wherein the graphical content includes an interactive graphical user interface (GUI) element that indicates the current status of the device, and wherein the interactive GUI element enables modification to the current status of the device.

7. The method of claim 1, further comprising:
subsequent to the additional suggestion content being displayed at the user interface to supplement the subset of the autofill suggestions, receiving a second user input that selects an autofill suggestion, of the subset of the autofill suggestions, and
in response to receiving the second user input, causing an application action suggested by the selected autofill suggestion to be performed.

8. The method of claim 1, wherein the subset of the autofill suggestions include a particular autofill suggestion that suggests particular media content, and the additional suggestion content includes a preview of the particular media content to supplement the particular autofill suggestion.

9. The method of claim 8, wherein the additional suggestion content further includes a portion of the particular media content, wherein the portion of the particular media content is buffered into a memory of the client device in response to receiving the additional suggestion content.

10. The method of claim 1, further comprising:
receiving, from the server device, command data generated by the server device based on the autofill suggestion data, wherein the command data is received along with the additional suggestion content, and wherein the command data facilitate performance of the subset of the application actions.

11. The method of claim 10, wherein the command data includes an embedded link that, when executed, causes a corresponding application from the one or more applications to perform a corresponding application action from the subset of the application actions.

12. The method of claim 10, wherein the command data includes network data for establishing a connection between the client device and one or more devices controllable by a subset of the applications that correspond to the subset of the autofill suggestions.

13. A method implemented by one or more processors of a client device, the method comprising:
receiving, via the client device, a first user input, the first user input being a partial user input that includes one or more natural language characters;
in response to receiving the partial user input via the client device:
determining one or more autofill suggestions based on the one or more natural language characters,
causing the one or more autofill suggestions to be displayed at a user interface of the client device, the one or more autofill suggestions suggesting one or more application actions performable by one or more applications,
communicating autofill suggestion data that characterizes a subset of the autofill suggestions to a server device, the subset of the autofill suggestions being selected from the one or more autofill suggestions and suggesting a subset of application actions from the one or more application actions, and
receiving, from the server device, command data generated by the server device based on the autofill suggestion data,
wherein the command data is accessible by a subset of applications, from the one or more applications, to initiate the subset of the application actions suggested by the subset of the autofill suggestions; and
prior to receiving a second user input that selects any of the one or more autofill suggestions, causing at least one application of the subset of the applications to access the command data in preparation for fulfilling at least one application action of the subset of the application actions.

14. The method of claim 13, further comprising:
ranking the one or more autofill suggestions; and
selecting one or more top ranked autofill suggestions from the ranked one or more autofill suggestions as the subset of the autofill suggestions.

15. The method of claim 13, further comprising:
receiving, from the server device, additional suggestion content generated by the server device based on the autofill suggestion data, wherein the additional suggestion content supplements the subset of the autofill suggestions.

16. The method of claim 15, wherein the additional suggestion content includes graphical content that indicates a current status of a device that is controllable by a first application, of the one or more applications, that corresponds to a first autofill suggestion from the subset of the autofill suggestions.

17. The method of claim 16, wherein the graphical content includes an interactive graphical user interface (GUI) element that indicates the current status of the device, and wherein the interactive GUI element enables modification to the current status of the device.

18. A method implemented by one or more processors of a client device, the method comprising:
receiving, via the client device, a user input that characterizes a portion of an assistant command directed to an automated assistant;
in response to receiving the user input that characterizes the portion of the assistant command via the client device:
determining autofill suggestions based on the portion of the assistant command, the autofill suggestions suggesting assistant actions performable by the automated assistant,
generating, based on the autofill suggestions, client command data that characterizes each assistant action of the assistant actions suggested by the autofill suggestions,
selecting, based on the client command data, a first set of the assistant actions from the client command data, communicating autofill suggestion data that characterizes the autofill suggestions to a server device, receiving, from the server device, data indicating selection of a second set of the assistant actions from server command data, the server command data being generated by the server device in response to receiving the autofill suggestion data that characterizes the autofill suggestions, the server command data characterizing each assistant action of the assistant actions suggested by the autofill suggestions, and causing, to be initialized, performance of a particular assistant action in the first set of the assistant actions and performance of another particular assistant action in the second set of the assistant actions.

19. The method of claim 18, wherein the first set of assistant actions are selected further based on historical client data that characterizes previous interactions between a user of the client device and the automated assistant installed at the client device.

20. The method of claim 18, wherein the second set of assistant actions are identified based on previous interactions between one or more users and the automated assistant.

\* \* \* \* \*